US012703123B2

(12) United States Patent
Wick et al.

(10) Patent No.: US 12,703,123 B2
(45) Date of Patent: Aug. 11, 2026

(54) DEVICE FOR DEGASSING OF A TWO-COMPONENT MULTIPHASE POLYMER-MONOMER MATERIAL AND USE THEREOF IN A DEGASSING EXTRUDER

(71) Applicant: Röhm GmbH, Darmstadt (DE)

(72) Inventors: Thomas Wick, Floersheim-Dalsheim (DE); Jan Müller, Framersheim (DE); Olaf Pickenäcker, Lampertheim (DE)

(73) Assignee: Röhm GmbH, Darmstadt (DE)

( * ) Notice: Subject to any disclaimer, the term of this patent is extended or adjusted under 35 U.S.C. 154(b) by 554 days.

(21) Appl. No.: 18/251,389

(22) PCT Filed: Nov. 1, 2021

(86) PCT No.: PCT/EP2021/080235

§ 371 (c)(1),
(2) Date: May 1, 2023

(87) PCT Pub. No.: WO2022/090526

PCT Pub. Date: May 5, 2022

(65) Prior Publication Data

US 2024/0017443 A1 Jan. 18, 2024

(30) Foreign Application Priority Data

Nov. 2, 2020 (EP) .................................... 20205162

(51) Int. Cl.
*B01D 19/00* (2006.01)
*B29B 7/42* (2006.01)
(Continued)

(52) U.S. Cl.
CPC .............. *B29B 7/845* (2013.01); *B01D 19/00* (2013.01); *B29B 7/42* (2013.01); *B29C 48/767* (2019.02)

(58) Field of Classification Search
CPC ...................................................... B01D 19/00
See application file for complete search history.

(56) References Cited

U.S. PATENT DOCUMENTS 1,698,314 A * 1/1929 Mapelsden ............... G01F 1/44
138/44
2,795,931 A * 6/1957 Foll ......................... F02K 7/067
60/39.77
(Continued)

FOREIGN PATENT DOCUMENTS

CN 1143330 A 2/1997
CN 100369943 C 2/2008
(Continued)

OTHER PUBLICATIONS

Boles, Cengel, "Thermodynamics of High-Speed Gas Flow", Thermodynamics, Third Edition, Apr. 7, 2014, XP093327155, Retrieved from the Internet: URL:https://www.slideserve.com/chun/thermodynamics-of-high-speed-gas-flow, pp. 1-44.
(Continued)

*Primary Examiner* — Robert A Hopkins
(74) *Attorney, Agent, or Firm* — Grüneberg Global IP, PLLC

(57) ABSTRACT

A device can be used for the degassing of a two-component multiphase polymer-monomer material. A corresponding degassing extruder contains the degassing device. The device for degassing contains at least one nozzle part having a convergent geometry, at least one constant part, and at least one diffusor part having a divergent geometry. The diffusor part contains at least three zones each having a divergent geometry, and the opening angles of the zones are specifically adapted in order to improve the separation of components of the polymer material. A process for degassing a polymer material uses the degassing device.

15 Claims, 3 Drawing Sheets

(51) Int. Cl.

| | |
|---|---|
| ***B29B 7/84*** | (2006.01) |
| ***B29C 48/76*** | (2019.01) |

(56) References Cited

U.S. PATENT DOCUMENTS

| | | | | |
|---|---|---|---|---|
| 3,156,091 | A * | 11/1964 | Kraus | F02K 9/974 138/155 |
| 4,233,429 | A | 11/1980 | Hoerauf et al. | |
| 4,312,642 | A | 1/1982 | Lehr et al. | |
| 4,334,783 | A | 6/1982 | Suzaka | |
| 5,609,831 | A | 3/1997 | Kempter | |
| 5,810,052 | A * | 9/1998 | Kozyuk | B01F 25/42 138/40 |
| 7,086,417 | B2 * | 8/2006 | De Almeida | F04F 1/20 417/198 |
| 2010/0193988 | A1 | 8/2010 | Carloff et al. | |
| 2011/0182132 | A1 | 7/2011 | Lechner et al. | |
| 2011/0188336 | A1 | 8/2011 | Carloff et al. | |
| 2012/0123084 | A1 | 5/2012 | König et al. | |
| 2013/0292064 | A1 | 11/2013 | Taylor et al. | |
| 2021/0115769 | A1 * | 4/2021 | Zhu | E21B 41/0078 |
| 2021/0246764 | A1 * | 8/2021 | Zhu | E21B 43/12 |
| 2022/0240888 | A1 * | 8/2022 | Abramov | G10K 11/26 |

FOREIGN PATENT DOCUMENTS

| | | |
|---|---|---|
| CN | 102336864 | 2/2012 |
| CN | 102858415 A | 1/2013 |
| DE | 42 27 542 | 2/1994 |
| DE | 10 2007 045 155 | 4/2009 |
| DE | 10 2007 045 156 | 4/2009 |
| EP | 0 000 728 | 2/1979 |
| EP | 0 015 457 | 9/1980 |
| EP | 0 027 700 | 4/1981 |
| EP | 0 490 359 | 6/1992 |
| EP | 2 255 860 | 12/2010 |
| EP | 2 353 839 | 8/2011 |
| EP | 3 088 424 | 11/2016 |
| EP | 3 103 819 | 12/2016 |
| EP | 3 178 854 | 6/2017 |
| JP | H01-123853 | 5/1989 |
| JP | H06-36807 U | 5/1994 |
| JP | 2001246362 A * | 9/2001 |
| WO | 2009/040189 | 4/2009 |
| WO | 2009/040190 | 4/2009 |
| WO | 2018/154506 | 8/2018 |

OTHER PUBLICATIONS

International Search Report issued Jan. 27, 2022, in PCT/EP2021/080235, 5 pages.

Written Opinion issued Jan. 27, 2022, in PCT/EP2021/080235, 6 pages. .

* cited by examiner

DEVICE FOR DEGASSING OF A TWO-COMPONENT MULTIPHASE POLYMER-MONOMER MATERIAL AND USE THEREOF IN A DEGASSING EXTRUDER

CROSS-REFERENCE TO RELATED APPLICATIONS

This application is the National Stage entry under § 371 of International Application No. PCT/EP2021/080235, filed on Nov. 1, 2021, and which claims the benefit of priority to European Patent Application No. 20205162.9, filed on Nov. 2, 2020. The content of each of these applications is hereby incorporated by reference in its entirety.

BACKGROUND OF THE INVENTION

Field of the Invention

The present invention is directed to a device for degassing of a two-component multiphase polymer-monomer material (in the following referred to as polymer material) and a degassing extruder comprising the inventive degassing device. The inventive device for degassing comprises at least one nozzle part having a convergent geometry, at least one constant part, and at least one diffusor part, having a divergent geometry, wherein the diffusor part comprises at least three zones each having a divergent geometry, and wherein the opening angles of said zones, preferably the ratio of length and opening angle, are specifically adapted in order to improve the separation of the components of the polymer material.

Furthermore, the invention is directed to a process for degassing a polymer material, in particular a mixture of at least polymer and at least one unreacted monomer obtained in a polymerization process, using the inventive degassing extruder. The invention is also directed to the use of the inventive device for degassing (e.g. via flash evaporation) a polymer material comprising at least one polymer and at least one monomer.

DESCRIPTION OF RELATED ART

Often polymerization processes are carried out via bulk or solution polymerization, wherein the polymer product is typically obtained in an inert solvent or dissolved in the unreacted monomer. In order to isolate the polymer from the reaction mixture, it is necessary to remove the residual monomers and/or the solvent and/or optionally other volatile components, for example via degassing or evaporation. This degassing usually takes place in a degassing extruder. Degassing extruders are also used for producing thermoplastic molding compositions, in particular if the intention is to remove residual monomers from the input plastic. Such degassing extruders are widely used and described in the prior art. By way of example, EP 0 490 359 A1 describes a single-screw degassing extruder for thermoplastic materials and rubber, wherein the extruder comprises a degassing zone, a pin-lined barrel and transfer mixing sections. Typically, the structure of such known degassing extruders encompasses that the polymer material stream to be degassed is introduced at the drive side of the extruder screw and conveyed towards the screw tip. Typically, the material is degassed at atmospheric pressure or with the aid of suction downstream of the material feed.

WO 2009/040189 and WO 2009/040190 describe the degassing of a polymer material in a degassing extruder, wherein the gas stream arising in the degassing zone is conducted in opposite direction to the polymer stream, wherein the degassed polymer is typically conducted in the direction of the drive side. Similar degassing process is described in EP 0 015 457, wherein a multiphase flow is fed directly to a transverse flow in which the liquid is discharged in a helical channel rotating about its screw axis.

The document CN 102336864 A describes a method for preparing methyl methacrylate polymer having high thermal stability via continuous bulk polymerization or solution polymerization using methyl methacrylate and a co-monomer, such as ethyl acrylate. The polymer chain degradation shall be reduced. The reaction mixture after polymerization is transported into a degassing extruder, wherein the formation of so-called head-to-head bond in the PMMA chain is avoided by optimized extruder conditions, e.g. temperature and residence time.

The document CN 100369943 A describes a method for producing a meth acrylic polymer by radical polymerization of a monomer composition containing methyl methacrylate and a radical polymerization initiator, wherein the supply amount of the radical polymerization initiator is reduced when the polymerization temperature increases, and the process is carried out at a constant temperature. After polymerization, volatiles are continuously removed using a devolatilization extruder.

EP 2 353 839 describes degassing of a polymer melt, for example a polymer suspension of PMMA (polymethylmethacrylate) and methyl methacrylate, using perforated plate and/or flash valve in the inlet degassing unit.

EP 3 088 424 and EP 3 103 819 describe a method for manufacturing a (meth)acrylic resin composition via continuously bulk polymerization in a tank reactor, wherein mixing time, half-life of the radical initiator, agitation power of the tank reactor mean residence time and concentration of the radical initiator are controlled. The reaction mixture is fed into a degassing extruder separating the polymer and the unreacted monomer.

The document EP 3 178 854 describes a method for producing a (meth)acrylic resin composition comprising continuously bulk polymerization of a reaction mixture comprising methyl methacrylate, a chain transfer agent, a radical polymerization initiator and optionally an acrylic acid ester in a tank reactor, heating the reaction product with a heat exchanger, removing volatile matter from the product and adding a filtrated liquid additive. The degassing extruder may comprise a rear vent and a front vent.

The document U.S. Pat. No. 4,334,783 A describes a mixing device for mixing polymer substances in molten state with additives, for example fillers. Said mixing device comprises at least one mixing nozzle having an orifice portion, an upstream compression zone and a downstream diffusion zone, wherein the downstream diffusion zone exhibits one constant opening angle. Further, the degassing of a polymer/monomer mixture is not described.

The degassing of polymer melts containing volatile components, such as solvents and/or residual monomers, in a so-called flash evaporation, typically carried out in flash camber or degassing chamber, is commonly known in the state of art. For example, EP 2 255 860 A1 describes an apparatus and a process for degassing polycarbonate solutions, wherein a combination of a flash chamber and a degassing extruder is utilized. Further, EP 0 027 700 A2 describes a flash-drying process which comprises flashing a solvent solution of a polymer, e.g. an elastomeric olefin copolymer, into a flashing zone wherein the solvent is evaporated and separated from the polymer. Generally, in such flash evaporation processes the polymer melt is expanded very suddenly so that the volatile components (e.g. monomers, oligomers, solvents) are evaporated.

The prior art does not provide a solution to optimize the separation (degassing) of a polymer material using improved flow geometry when feeding the polymer material into a degassing zone, e.g. the degassing zone of a flash chamber or the degassing section of an extruder. Thus, there is a high need for improved degassing devices having optimized flow geometry, which can be constructed with little effort and which can be easily utilized in commonly known degassing extruders.

SUMMARY OF THE INVENTION

Object of the Invention

An object underlying the invention is therefore to provide an improved degassing device and an improved process for degassing of a polymer material, wherein the effectiveness in removing monomer and optional other volatile components (e.g. solvents) from the polymer is increased, so that a degassed polymer material, having a reduced amount of unreacted monomers, is obtained. As a consequence, the downstream processing and degassing of the polymer material is facilitated. In line with this, it is an object of the invention to provide an optimized separation of monomer out of polymer products, wherein such polymer products can be obtained cost-efficiently and with low or reduced energy consumption. In particular higher output rates can be achieved compared to the state of the art.

Achievement of Object

It was found that monomers and optional further volatile components of a polymer material can be removed more effectively using a degassing device having a specific geometry, preferably a specific designed diffusor part. The inventive degassing device can be used easily and effectively for distribution of the polymer material into a degassing zone, e.g. into a degassing chamber or a flash chamber or into the degassing zone of a degassing extruder.

In particular it was found that the flow separation (i.e. separation of the flow from the inner wall of the device) and therefore the resistance of the gas flow can be highly efficiently reduced. Therefore, back mixing can be reduced utilizing different diffusor zones with specific opening angles. In particular specific ratios of length and opening angle are utilized. Preferably, the present invention also applies the physical effect of acceleration of flow velocity of supersonic fluid flow systems passing divergent flow geometry, as it is often utilized in Laval nozzles. In particular, the first zone (also referred to as feeding zone or acceleration zone) of the diffusor part is constructed, so that the flow separation of the flow from the wall of the diffusor is prevented or minimize. On the other side the efficiency of the diffusor should be optimized in the first zone. In particular, the second zone (also referred to as slowdown zone) follows up directly after the first zone and is constructed in combination with Z1 in order to minimize flow separation and radial mixing of the two components of the polymer material. Furthermore, the last zone of the diffusor part (also referred to as distribution zone) is constructed so that the components of the polymer material are distributed into a degassing zone after the diffusor allowing free movement of the components in order to avoid back mixing of the components.

Preferably, the inventive degassing device can be utilized in backwards degassing systems, wherein the separated gas stream is conducted in opposite direction to the degassed polymer stream.

DETAILED DESCRIPTION OF THE INVENTION

Device for Degassing

Figure 1:
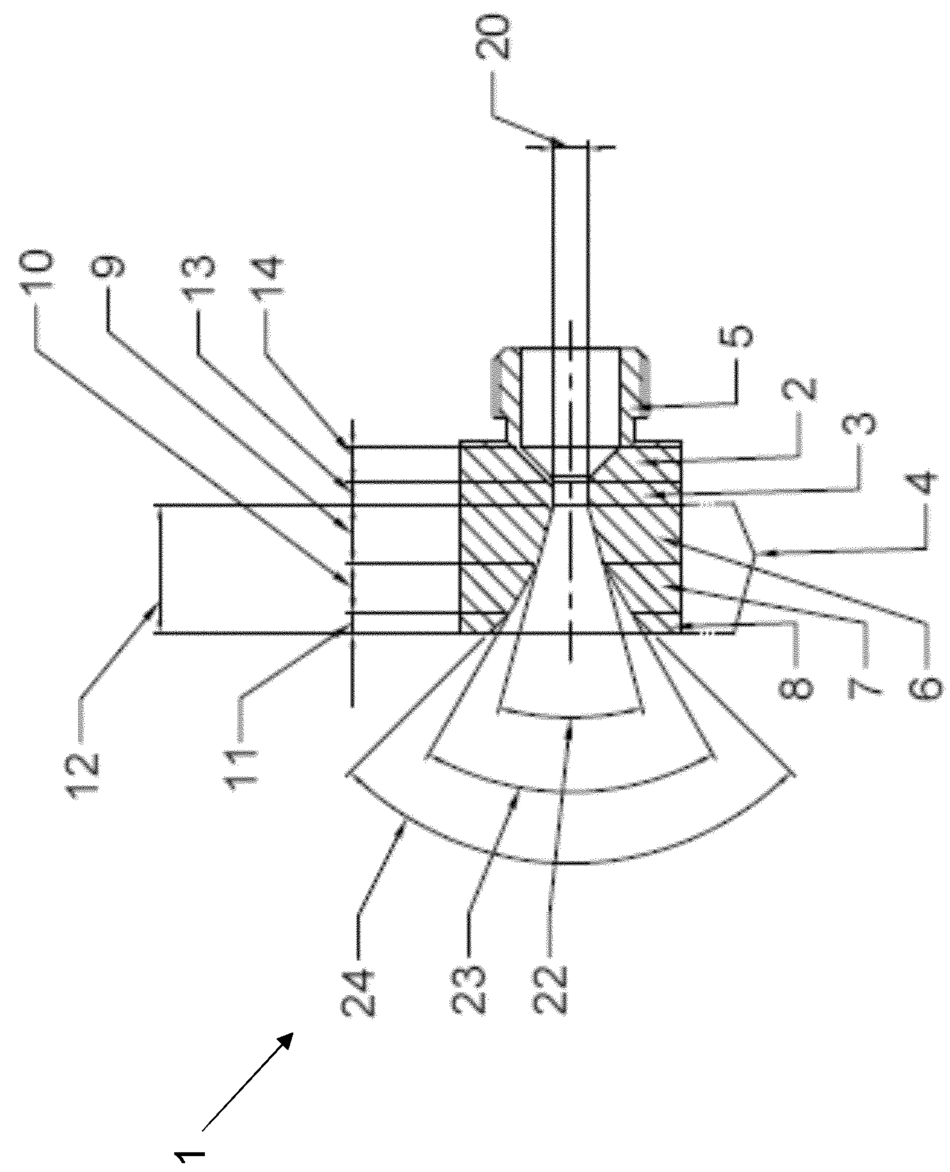
FIG. 1 shows an embodiment of the inventive device for degassing.

The present invention is directed to a device for degassing of a polymer material comprising (preferably consisting of) at least one nozzle part having a convergent geometry, at least one constant part, and at least one diffusor part, having a divergent geometry, wherein the diffusor part comprises a first zone Z1 having first length L1 and a first opening angle A1, a second zone Z2 having a second length L2 and second opening angle A2, and a third zone Z3 having a third length L3 and a third opening angle A3, wherein each zone Z1, Z2 and Z3 exhibit a divergent geometry, and wherein for the opening angles it applies that $$A1 < A2 < A3$$

More preferably, for the ratio of length and opening angle it applies that $$L1/A1 > L2/A2 > L3/A3.$$

In terms of the present invention a "nozzle" or a "nozzle part" is a device or part of a device having convergent geometry, wherein convergent geometry means that the diameter of the inner channel (i.e. the channel in which the polymer material is conveyed) of the device or of the part of the device decreases in downstream direction. In particular the diameter continuously decreases over the whole length of the convergent geometry in downstream direction. Generally, for subsonic fluid flow a nozzle or nozzle part increases the velocity and reduces the static pressure of a fluid passing through the system.

In terms of the present invention a "polymer material" is a material comprising at least one polymer and at least one volatile component, in particular at least one monomer. Typically, the polymer material comprises at least one polymer, at least one monomer and optionally one or more other components, e.g. volatile components.

In terms of the present invention a "constant part" is a part of a device, in which the diameter of the inner channel (i.e. the channel in which the polymer material is conveyed) is constant over the total length of the constant part.

In terms of the present invention a "diffusor" or "diffusor part" is a device or part of a device having divergent geometry, wherein divergent geometry means that the diameter of the inner channel (i.e. the channel in which the polymer material is conveyed) of the device or of the part of the device increases in downstream direction (e.g. in direction of polymer flow). In particular the diameter continuously increases over the whole length of the divergent geometry in downstream direction. Generally, for subsonic fluid flow a diffusor or diffusor part reduces the velocity and increases the static pressure of a fluid passing through the system.

More preferably, the nozzle part of the inventive device, having convergent geometry, is described as one or more zones each having linear decreasing diameter in downstream direction. More preferably, the diffusor zones Z1, Z2 and Z3 of the inventive device, having divergent geometry, are each described as a zone of having linear increasing diameter in downstream direction.

In terms of the present invention "opening angle" of a diffusor or a nozzle or a part or zone thereof is understood as being the angle between the lines representing the inner walls (i.e. the walls of the channel in which the polymer material is conveyed) of the diffusor or nozzle. In case of a non-linear geometry of inner walls the lines representing the inner wall can be extrapolated to the wall geometry.

In terms of the present invention "downstream" or "downstream direction" and "upstream" or "upstream direction" refer to the direction of conveying of the polymer material or of the degassed polymer material. In particular, downstream direction means the direction of conveying the polymer material or the degassed polymer material. In particular upstream direction means the direction opposite to the direction of conveying the polymer material or the degassed polymer material.

Typically, the nozzle part, at least one constant part and the diffusor part are arranged in downstream direction (e.g. in direction of flow of polymer material) in the order nozzle part/constant part/diffusor part. Preferably, the nozzle part, at least one constant part and the diffusor part are arranged directly after each other in downstream direction.

In a preferred embodiment the inventive device may comprises an additional constant part arranged upstream the nozzle part.

Nozzle Part

Preferably, the nozzle part is constructed, so that the flow velocity of the polymer material is accelerated, preferably up to supersonic fluid flow. The minimum diameter of the nozzle part (i.e. the convergent flow geometry) may be adjusted in order to achieve sound velocity of the two-phase polymer material. Generally, sound velocity is reduced in multi-phase flow systems, e.g. polymer material comprising a gaseous monomer phase and a liquid phase. Thus, the diameter required for achievement of sound velocity may be within a dimension, that can be easily constructed, and the loss of pressure is acceptable.

In a further preferred embodiment, the nozzle part has a length L6, wherein said length L6 is from 20% to 40% of the total length L4 of the diffusor part. Typically, the nozzle part exhibits convergent geometry over the whole length of the nozzle part. Typically, the opening angle of the nozzle part is in the range of 50° to 95°.

Typically, the convergent geometry of the nozzle part is constructed, so that the necessary acceleration of flow velocity is obtained. In a preferred embodiment, the ratio of the greatest diameter of the nozzle part (in particular at the upstream end of the nozzle part) in relation to the smallest diameter of the nozzle part (in particular at the downstream end of the nozzle part) is in the range of 2 to 4, preferably 2.5 to 3.5. Preferably, the ratio of the diameter of the constant part arranged upstream the nozzle part in relation to the diameter of the constant part (constant part (3) after the nozzle part) is in the range of 2 to 4, preferably 2.5 to 3.5.

In another embodiment the nozzle part comprises (in downstream direction) a first convergent zone and a second convergent zone, wherein the opening angle of said first convergent zone is greater than the opening angle of said second convergent zone.

Constant Part

Preferably, the constant part, which is arranged downstream of the nozzle part and upstream of the diffusor part, is constructed so that the velocity of the polymer material is equalized, i.e. a homogenous flow profile over the diameter of the flow geometry is obtained. Preferably, the flow velocity of the polymer material is further accelerated in the constant part, preferably up to supersonic fluid flow. Preferably, the length of the constant part between the nozzle part and the diffusor part is reduced to a minimum in order to achieve a homogenous flow profile.

Preferably, the constant part between the nozzle part and the diffusor part has a length L5, wherein said length L5 is from 5% to 25%, preferably from 10 to 20%, of the total length L4 of the diffusor part.

For example, the length L5 can be in the range of 1 to 10 mm, preferably 2 to 5 mm, more preferably in the range of 3.0 to 5.0 mm.

Typically, the diameter of the constant part is in the range of 4 mm to 10 mm, preferably in the range of 5 mm to 7 mm.

Diffusor Part

Generally, the diffusor part, which is arranged downstream the constant part and the nozzle part, uses the fact that flow properties in a diffusor (i.e. in a divergent flow geometry) changes when the flow velocity changes from subsonic fluid flow to supersonic fluid flow. Generally, the flow velocity of a supersonic fluid flow increases when passing divergent flow geometry. Due to the higher flow velocity, higher turbulence and uniform flow component into axial direction can be obtained. Further, the length of highest turbulence should be reduced as much as possible in order to avoid flow components in radial direction.

Generally, flow separation (separation of flow from the diffusor walls) in the diffusor part results in mixing of the components which should be avoided in order to increase the separation of the two-phase polymer material, i.e. to improve degassing of the polymer material. Preferably, the diffusor part is constructed so that flow separation and mixing of the components is avoided or at least reduced.

In particular, the first zone Z1 of the diffusor part (also referred to as feeding zone or acceleration zone) is constructed so that the flow separation of the flow from the wall of the diffusor is prevented or minimize. On the other side, the efficiency of the diffusor should be optimized in the first zone Z1. Typically, the second zone Z2 (also referred to as slowdown zone) follows directly after the first zone and it is constructed in combination with Z1 in order to minimize flow separation and radial mixing of the components of the polymer material, i.e. the liquid phase and the gaseous monomer. In particular, the opening angle A2 of the second zone Z2 is greater than the opening angle A1 of the first zone Z1. Typically, the length L2 of the second zone Z2 is less than the length L1 of the first zone Z1.

Typically, the third zone Z3 (also referred to as distribution zone) is constructed so that the components of the polymer materials (i.e. the gaseous monomer and the liquid phase) are distributed into a degassing zone after the diffusor part allowing free movement of the components in order to avoid back-mixing of the components or phases. Typically, the end diameter of the distribution zone is as high as possible in order to allow free movement and to avoid a mixing of the two phases. Typically, the opening angle A3 of the third zone Z3 is greater than the opening angle A2 of the second zone Z2 and greater than the opening angle A1 of the first zone Z1. Typically, the length L3 of the third zone Z3 is less than the length L2 of the second zone Z2 and less than the length L1 of the first zone Z1.

According to the invention the opening angle in the diffusor zones increases in downstream direction, i.e. A1<A2<A3. According to the invention the opening angle A2 in the second zone Z2 is greater than the opening angle A1 in the first zone Z1 and the opening angle A3 in the third zone Z3 is greater than the opening angle A2 in the second zone Z2 (A1<A2<A3). Preferably, the opening angle A1 of the first zone Z1 of the diffusor part is from 40% to 60%, preferably from 45% to 55%, of the opening angle A2 of the second zone Z2 of the diffusor part. Preferably, the opening angle A2 of the second zone Z2 of the diffusor part is from 55% to 75%, preferably from 60% to 70%, of the opening angle A3 of the third Z3 of the diffusor part.

According to a preferred embodiment of the invention the ratio of length and opening angle (L/A) in the diffusor zones decreases in downstream direction. According to this preferred embodiment the ratio of length and opening angle L2/A2 in the second zone Z2 is less than ratio of length and opening angle L1/A1 in the first zone Z1 and the ratio of length and opening angle L3/A3 in the third zone Z3 is less than ratio of length and opening angle L2/A2 in the second zone Z2 (L1/A1>L2/A2>L3/A3).

Typically, the zones Z1, Z2, and Z3 of the diffusor part are arranged in downstream direction (e.g. in direction of flow of polymer material) in the order Z1-Z2-Z3. Preferably, the zones Z1, Z2, and Z3 are arranged directly after each other in downstream direction.

In a preferred embodiment the diffusor part consists of the zones Z1, Z2 and Z3, wherein the zones are arranged in downstream direction in the order Z1-Z2-Z3.

In a preferred embodiment the ratio L2/A2 of the second zone Z2 of the diffusor part is from 33% to 43%, preferably from 35% to 40%, of the ratio L1/A1 of the first zone Z1 of the diffusor part, and the ratio L3/A3 of the third zone Z3 of the diffusor part is from 5% to 15%, preferably from 8% to 12%, of the ratio L1/A1 of the first zone Z1 of the diffusor part.

In a further preferred embodiment in the first zone Z1 the ratio of length and opening angle L1/A1 is in the range of 0.1 to 0.6 mm/°, preferably in the range of 0.2 to 0.5 mm/°; more preferably in the range of 0,3 to 0.4 mm/°; in the second zone Z2 the ratio of length and opening angle L2/A2 is in the range of 0.05 to 0.4 mm/°, preferably in the range of 0.1 to 0.3 mm/°, more preferably in the range of 0,1 to 0.2 mm/°; and in third zone Z3 the ratio of length and opening angle L3/A3 is in the range of 0.01 to 0.2 mm/°, preferably in the range of 0.02 to 0.1 mm/°, more preferably in the range of 0.03 to 0.06 mm/°.

Preferably, the diffusor part has the total length L4, wherein the first length L1 is from 41% to 51% of the total length of the diffusor part L4; the second length L2 is from 32% to 42% of the total length of the diffusor part L4; and the third length L3 is from 12% to 22% of the total length of the diffusor part L4.

For example, the total length of the diffusor part L4 can be in the range of 10 to 40 mm, preferably 20 to 30 mm.

For example, the opening angle A1 of the first zone Z1 of the diffusor part may be in the range of 20° to 40°. For example, the opening angle A2 of the second zone Z2 of the diffusor part may be in the range of 50° to 70°. For example, the opening angle A3 of the third zone Z3 of the diffusor part may be in the range of 80° to 100°.

Preferably, the smallest diameter in the first zone Z1 of the diffusor part is in the range of 4.0 to 8.0 mm, preferably about 6.2 mm.

Preferably, the highest diameter in the third zone Z3 of the diffusor part is in the range of 35.0 mm to 45.0 mm, more preferably about 40.0 mm In a particular embodiment the device comprises an additional constant part arranged upstream the nozzle part having a length L9, wherein the length L9 of said constant part is from 1.0 to 3.0 times of the total length L6 of the nozzle part. For example, the length L9 of constant part can be in the range of 5.0 to 25 mm, preferably from 6.0 to 20 mm. For example, the diameter L11 of the constant part can be in the range of 10 to 30 mm, preferably in the range of 15 to 25 mm.

The inventive degassing device is preferably used for flash evaporation of a polymer material in molten state, wherein volatile components are separated in gaseous state from the polymer. Typically, this separation is carried out by feeding the polymer material through the inventive degassing device into a degassing zone. The inventive degassing device and the degassing zone may be utilized by commonly known devices, such as degassing chambers, flash chambers, degassing tubes, vacuum mixers, Banbury mixers, degassing extruders, such as single-screw or twin-screw extruders.

Degassing Extruder

Preferably, the inventive degassing device is used in the feed of a degassing extruder. The principle is for example described in WO 2009/040189 and WO 2009/040190.

In another aspect the present invention is directed to a degassing extruder comprising the inventive degassing device as described above. In particular the invention is directed to a degassing extruder for degassing of a polymer material, comprising at least one material feed, at least one extrudate outlet and at least one degassing section, which encompasses at least one degassing zone provided in the region of the material feed, and at least one gas outlet, wherein at least one inventive device for degassing as described above is provided to feed the polymer material from the material feed into the at least one degassing zone. Typically, the inventive device for degassing is placed in the degassing zone provided in the region of the material feed.

Typically, the inventive extruder encompasses the commonly known extruder parts, for example the inventive extruder encompasses at least one drive, at least one extruder barrel, at least one rotatably driven extruder screw mounted in the extruder barrel, at least one material feed, at least one extrudate outlet, at least one degassing section having at least one gas outlet. Generally, a suitable construction of the degassing extruder is described in WO 2009/040189 and WO 2009/040190.

It is advantageous that the degassing zone provided in the region of the material feed is formed via a section of the extruder barrel with increased internal diameter. The material feed here takes place in the region of the widened extruder barrel or at one of the margins of the widening, or outside the widening, if the location of the widening is upstream of the material-feed point. It is known in the prior art that the channel depth of the extruder screw can be altered, or the diameter of the extruder screw core can be reduced, but this is less advantageous, since in particular the latter variant leads to a weaker extruder-screw cross section. These two possibilities for screw modification can, of course, be used additionally.

It is advantageous that at least two inventive devices for degassing as described above are provided at the periphery of the extruder barrel at least two diametrically opposite points in the degassing zone. More preferably two inventive devices for degassing are provided as described.

Preferably, the degassed polymer material is conveyed out of the degassing zone in the direction opposite to the direction of evaporation, wherein this typically ensures effective separation of polymer and monomer at relatively high throughput. Preferably, the gas stream resulting from the degassing of the polymer material in the degassing section is conducted in upstream direction and in opposition to the direction of conveying of the degassed polymer. Preferably said gas stream is conducted to the upstream end of the extruder. For example, the gas outlet in said upstream direction can be placed at the end of and/or radially from and/or tangentially from the extruder barrel. Preferably, a condensation chamber may be provided after said gas outlet.

In a preferred embodiment the gas outlet of the inventive extruder is provided at the open upstream end of the extruder, wherein a condensation chamber is provided immediately after said gas outlet. It is preferable that the gas outlet in said upstream direction is provided at end of the extruder barrel, in particular in the region of the screw tip. By way of example, the upstream end of the extruder, e.g. the upstream end of the extruder barrel, is opened in such a way that the free end of the screw ends into the condensation chamber. It is possible to provide the possibility of withdrawing the extruder screw from the extruder, through the condensation chamber, without dismantling of assemblies built onto the extruder.

Typically, the condensation chamber can be provided immediately downstream of the gas outlet, for example directly attached by a flange.

For example, the condensation chamber may exhibit at least one device for spray introduction and at least one condensate run-off. Typically, the spray introduction is suitable for spraying or trickling a liquid into the condensation chamber. In particular a liquid is used, in which the polymer is soluble. In another embodiment a heat exchanger may be attached to the condensation chamber in order to effect condensation of the gas stream.

Preferably, the inventive extruder encompasses a first degassing section as described above and at least one further degassing section arranged downstream the first degassing section (in relation to the direction of conveying of the polymer material), wherein said further degassing section encompasses at least one gas outlet. Preferably, at least two, more preferably two or three, further degassing sections are provided after the first degassing section.

Process for Degassing

The present invention is also directed to a process for degassing of a polymer material, typically comprising at least one polymer and at least one monomer, and optionally solvents and/or other components, using the inventive degassing device, wherein the polymer material is fed through at least one inventive degassing device into at least one degassing zone, wherein volatile components, in particular monomer, are separated in gaseous state from the polymer. In this aspect, the invention is directed to a process for degassing of a polymer material, wherein the polymer material is at least partially degassed by feeding the polymer material through at least one inventive degassing device into at least one degassing zone, and wherein a gas steam arises in said degassing zone.

Typically, such process for degassing may be carried out in commonly known devices, such as degassing chambers, flash chambers, degassing tubes, vacuum mixers, Banbury mixers, degassing extruders, such as single-screw or twin-screw extruders.

The degassing of polymer melts containing volatile components, such as solvents and/or residual monomers, in a so-called flash evaporation, typically carried out in flash camber or degassing chamber, is commonly known in the state of art (e.g. EP 2 255 860 A1, EP 0 027 700 A2). Generally, in such flash evaporation processes the polymer melt is expanded very suddenly so that the volatile components (e.g. monomers, oligomers, solvents) are evaporated. The inventive degassing device can advantageously be utilized in such flash evaporation process and apparatus.

Preferably, the present invention is directed to a process for degassing of a polymer material comprising at least one polymer and at least one monomer, and optionally solvents and/or other components, using the degassing extruder as described above. In particular the invention is directed to a process for degassing of a polymer material, comprising at least one polymer and at least one monomer, using a degassing extruder as describe above, wherein the polymer material is at least partially degassed by feeding the polymer material into at least one degassing zone within the extruder through at least one inventive device as described above, and wherein a gas steam arises in the degassing zone.

The embodiments described above in connection with the inventive device and the inventive degassing extruder apply to the inventive process for degassing accordingly.

It is advantageous that a major portion of the degassing of the polymer material takes place when feeding the polymer material into the at least one degassing zone through the at least one inventive device for degassing. Preferably, the extent of degassing of the polymer material by feeding the polymer material through at least one inventive device is greater >5% by weight, based on the total amount of the monomers in the polymer material.

Any monomer and/or solvent still present in the polymer material can be subjected to further degassing downstream in one or more further degassing sections. Further degassing sections, including degassing zone and/or gas outlets, can be provided downstream and/or upstream, preferably downstream.

Preferably, the degassing of the polymer material in the degassing zone, in particular in the first degassing zone, is carried out via backward degassing, wherein the gas stream arising in the degassing zone during degassing is conducted in opposition direction to the polymer stream (i.e. the stream of the degassed polymer material). According to a preferred embodiment a degassed polymer stream arising in the degassing zone during degassing is conveyed in downstream direction and the gas stream arising in the degassing zone during degassing is conveyed in in upstream direction (i.e. to the upstream end of the extruder). The polymer material fed in and subject to pressure and heat is directly depressurized in the region of the material feed into the extruder, so that the evaporation of the solvent or monomer takes place in the degassing zone. This produces a large volume stream of vapor, which can be dissipated with minimum entrainment of polymer in the direction of the condensation chamber.

One advantageous variant of the process provides that the gas arising is condensed in a container immediately at the gas outlet of the extruder.

It is possible that the condensation is carried out via spray condensation, where a liquid is sprayed into, or trickled into, the system, preferably a liquid in which the polymer is soluble. However, condensation in a heat exchanger attached to the condensation chamber is also possible.

Polymer Material

In particular, the polymer material comprises at least one monomer and at least one polymer and optionally at least one solvent and/or other components. Typically, the polymer material comprises at least 30% by weight, preferably at least 40% by weight, also preferably at least 50% by weight, based on the total polymer material, of at least one monomer. Further, the polymer material may comprise at least one solvent, e.g. an inert solvent, for example a solvent used in solution polymerization of the respective polymer.

Typically, the polymer material has a viscosity in the range of 500 to 2,500 mPas, measured at a temperature on the range of 210° C. to 230° C. Typically, the viscosity of the polymer material can be measured using a capillary viscosimeter. Further, the viscosity of the polymer material can be measured in the degassing process, e.g. via a suitable viscosimeter, for example a rotational viscosimeter, utilized in the material flow.

Preferably, the polymer material is a product obtained in a polymerization reaction, e.g. in a bulk polymerization process or in a solution polymerization process, wherein such polymerization product comprises the respective polymer and unreacted monomer. Preferably, the polymer material is a reaction mixture comprising polymer and unreacted monomer obtained in a bulk polymerization process for producing methacrylates. For example, the polymer material may comprise polymethylmethacrylate and unreacted monomer methyl methacrylate. For example, the polymer material is a reaction mixture, which is continuously fed from a polymerization reactor into the degassing extruder, optionally passing a heat exchange unit.

Preferably, the polymer material comprises at least one polymer, in particular in a molten and/or dissolved state, and at least one monomer (e.g. unreacted monomer from polymerization process) in liquid state and/or gaseous state. Preferably, the polymer material comprises at least two phases, wherein one phase is a gaseous phase comprising the at least one monomer and one phase is a liquid phase comprising the at least one monomer and the at least one polymer. Preferably, the liquid phase of the polymer material is a solution of the at least one polymer in the liquid monomer. In a preferred embodiment the polymer material is a two-component multiphase composition comprising at least one monomer in gaseous state, at least one monomer in the liquid state and at least one polymer dissolved in the liquid monomer. Furthermore, the polymer material may comprise at least one polymer in the molten state.

As the skilled person knows the state of aggregation of the components in the polymer material as well as type and amount of the phases (e.g. liquid phase and gaseous phase) depends on temperature, pressure and flow conditions in the inventive device and in the inventive extruder. For example, the description of the polymer material above applies to the polymer material during passing the inventive device for degassing and/or to the polymer material entering the degassing zone of the inventive extruder.

Use of the Inventive Device

In another aspect the present invention is directed to the use of the inventive degassing device as described above for degassing of a polymer material, by feeding the polymer material through the device, wherein the polymer material comprises at least one polymer and at least one monomer.

The embodiments described above in connection with the inventive process for degassing as well as the inventive device and degassing extruder apply to the inventive use accordingly.

Typically, the inventive device for degassing can be used in flash evaporation of the polymer material, wherein volatile components, e.g. unreacted monomer, are separated in gaseous state from the polymer, in particular the polymer in a molten state.

Preferably, the inventive device is used as a device for feeding a polymer material, in particular a multi-phase two component mixture, into a degassing zone, for example into a degassing chamber or flash chamber. More preferably, the inventive device is used as an inlet for the polymer material into a degassing zone of a degassing extruder. In particular the inventive device for degassing can be used in a degassing extruder as described in WO 2009/040189 or WO 2009/040190, preferably in the material feed.

Figure 2:
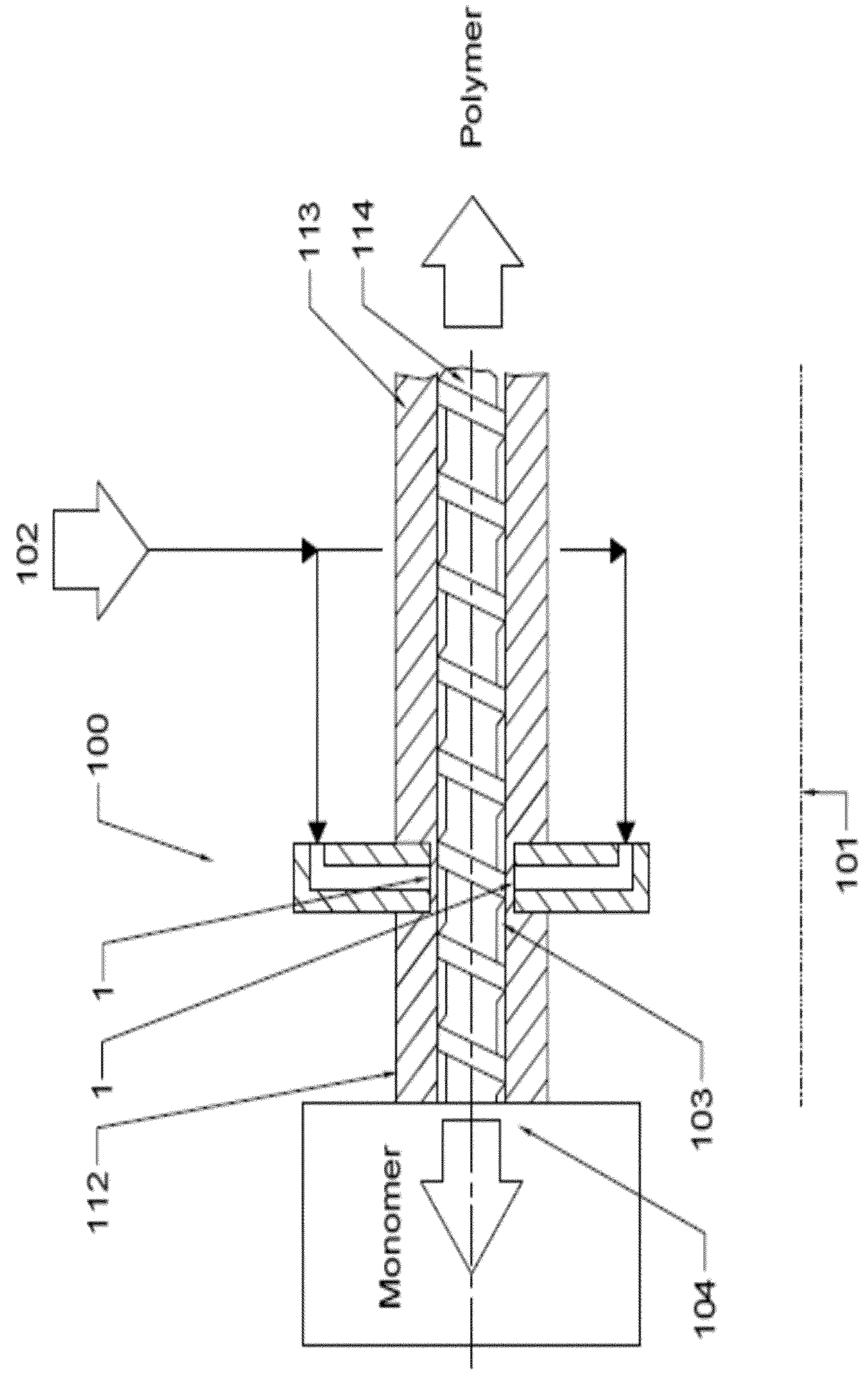
FIG. 2 shows a schematic of the degassing extruder with a degassing section including a gas outlet.
Figure 3:
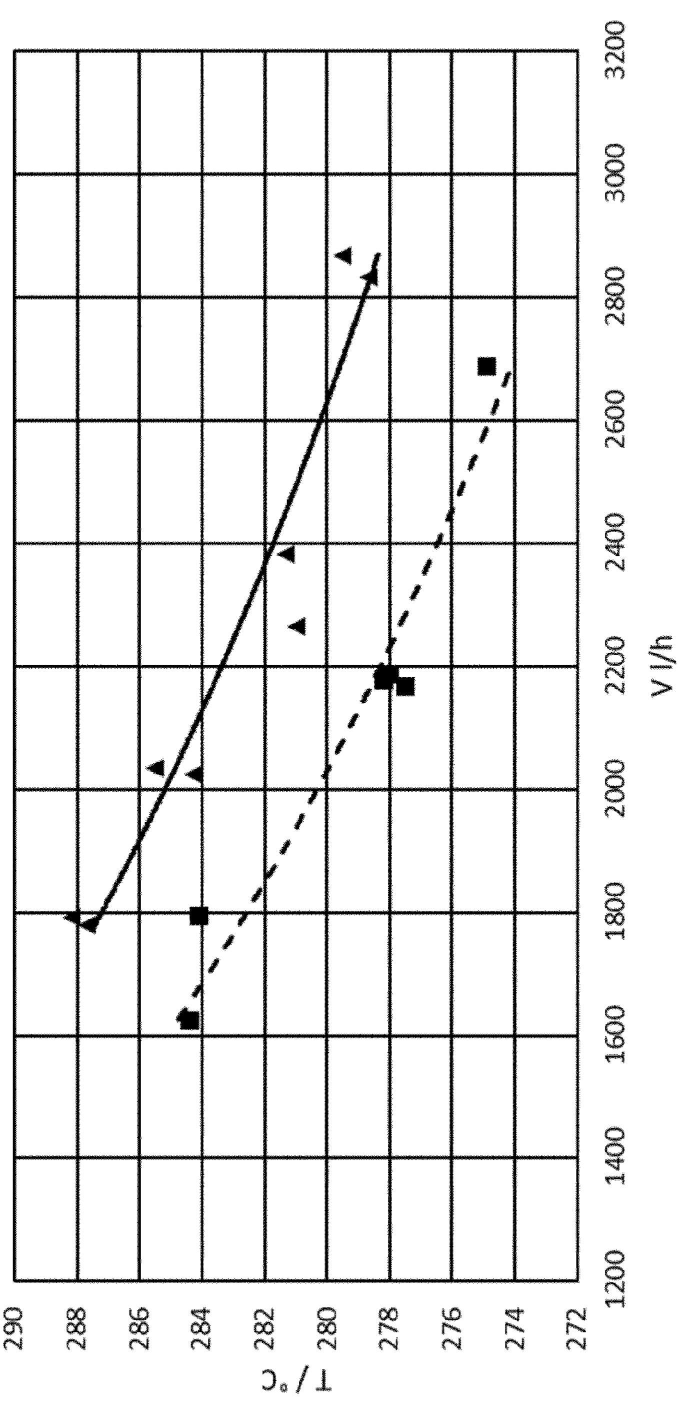
FIG. 3 shows a graph of temperature T (° C.) in the first heating zone, depending on the throughput V given in liters/hours (l/h).

The invention is illustrated in the FIGS. 1 to 3.

DESCRIPTION OF THE FIGURES

FIG. 1 shows an embodiments of the inventive device for degassing 1 comprising the nozzle part 2, the constant part 3 and the diffusor part 4, wherein the diffusor part 4 comprises the first zone Z1 6, having first length L1 9 and first opening angle A1 22, the second zone Z2 7, having second length L2 10 and second opening angle A2 23, and a third zone Z3 8 having third length L3 11 and third opening angle A3 24. Thus, the diffusor part 4 consists of the zones 6, 7 and 8. The constant part 3 exhibits the diameter L10 20. A further constant part 5 is arranged in upstream direction of the nozzle part 2.

Typically, the polymer material is introduced into constant part 5 arranged upstream of the nozzle part 2, afterwards the polymer material passes the nozzle part 2, the constant part 3 and the diffusor part 4 and leaves the device through the third zone Z3 8 of the diffusor part 4.

FIG. 2 schematically shows the degassing extruder 100 with degassing section 101 including a gas outlet 104. Also, the material feed 102, the extruder barrel 113 and the extruder screw 114 are shown schematically. The inventive device 1 is placed in the degassing zone 103 at material feed 102.

The material feed is introduced into the degassing zone 103 at two diametrically opposite points on the extruder barrel 113 by way of two inventive devices 1. The upstream end 112 of the extruder barrel 113 is open and may end into a condensation chamber attached thereto.

The polymer material is fed under conditions of pressure and heat into the extruder barrel 113 by way of the feed line 102, i.e. through the inventive device 1 into the degassing zone 103. A marked pressure reduction takes place in the degassing zone 103, and the monomer and/or the solvent can therefore be removed from the polymer material by degassing. Furthermore, the flow velocity of the polymer material is reduced in the same region.

In the FIG. 2, the polymer is conveyed towards the right-hand side (downstream). The gas or vapor arising in the degassing zone 103 is conveyed towards the left-hand side (upstream) in the direction of the upstream end of degassing extruder 112. The gas arising in the degassing zone 103 flows via the open end of the extruder, also marked as gas outlet 104.

FIG. 3 shows the temperature T (given in ° C.) in the first heating zone (which is the heating zone following the first degassing section 101 and which is arranged before a second degassing section) depending on the throughput V given in liters/hours (1/h). The comparative example 1 is represented by a dashed line and squares (■). The inventive example 2 is represented by a solid line and triangles (▲).

LIST OF REFERENCE SIGNS

1 Device for degassing
2 Nozzle part
3 Constant part
4 Diffusor part
5 Constant part arranged upstream of the nozzle part
6 First zone Z1 of the diffusor part
7 Second zone Z2 of the diffusor part
8 Third zone Z3 of the diffusor part
9 First length L1 of the diffusor part
10 Second length L2 of the diffusor part
11 Third length L3 of the diffusor part
12 Total length L4 of the diffusor part
13 Length L5 of constant part
14 Length L6 of the nozzle part
20 Diameter L10 of the constant part
22 First opening angle A1 of the diffusor part
23 Second opening angle A2 of the diffusor part
24 Third opening angle A3 of the diffusor part
100 Degassing extruder
101 Degassing section
102 Material feed
103 Degassing zone
104 Gas outlet
112 Upstream end of degassing extruder
113 Extruder barrel
114 Extruder screw The present invention is illustrated by the following examples.

EXAMPLES

Degassing of a polymer material was carried out in a degassing extruder according to FIG. 2. The polymer material comprised polymethylmethacylate and methylmethacrylate monomer (referred to as PMMA/MMA polymer material in the following). The PMMA/MMA polymer material was fed via material feed 102 through a degassing device 1 into the degassing section 101 of a degassing extruder 100. The degassing extruder further comprises a first heating zone following the first degassing section 101 and a second degassing section following the heating zone. The first heating zone and the second degassing zone are not shown in FIG. 2.

The degassing device was built up from a constant part (5) arranged upstream the nozzle part, a nozzle part (2) having a convergent geometry, a constant part (3), and a diffusor part (4), having a divergent geometry. According to example 1 (comparative example) the diffusor part (4) of the degassing device (1) was build up from only one divergent zone. According to example 2 (inventive example) the diffusor part (4) of the degassing device (1) was build up from three zones Z1, Z2 and Z3 as shown in FIG. 1, wherein for the opening angles of said zones it applies that A1<A2<A3. The constant parts (5), the nozzle parts (2), and the constant parts (3) of the degassing devices used in example 1 and 2 were comparable.

The geometry of the diffusor parts (4) are given in the following table 1

TABLE 1

| Geometry of the diffusor parts (4) | | | |
|---|---|---|---|
| Example | | 1 (comparative) | 2 (inventive) |
| L (one diffusor zone) | mm | 15 | |
| A (one diffusor zone) | ° | 30 | |
| L/A (one diffusor zone) | mm/° | 0.5 | — |
| L1/A1 | mm/° | — | 0.36 |
| L2/A2 | mm/° | — | 0.145 |
| L3/A3 | mm/° | — | 0.04 |

The level of degassing was determined via the temperature in the first heating zone, which is the heating zone following the first degassing section and which is before a second degassing zone.

By means of the inventive degassing device (example 2) it was possible to obtain a higher degassing of monomer from the polymer material during feeding the polymer material in the first degassing zone of the degassing extruder. This resulted in a less amount of monomer in the PMMA/MMA polymer material in the following degassing section (referred to as second degassing section in the following). Therefore, the energy required for degassing the monomer in the second degassing section is reduced. Or in other words, as the energy input in the first heating zone was constant, the temperature in said first heating zone raised due to improved degassing.

The results are summarized in the following table 2, wherein the temperature in the first heating zone is shown for comparable throughput. Furthermore, the results are shown and approximated in the FIG. 3, wherein the comparative example 1 is represented by a dashed line and squares (■) and the inventive example 2 is represented by a solid line and triangles (▲). FIG. 3 shows the temperature T in the first heating zone (given in ° C.) depending on the throughput V (given in liters/h l/h). It is shown that the temperature in the first heating zone is about 3 to 5 K (referring to about 1.75%) higher when using the inventive device (example 2) compared to the temperature using the comparative device (example 1).

TABLE 2

| Temperature in the first heating zone after the first degassing section | | |
|---|---|---|
| Example | Throughput l/h | Temperature first heating zone ° C. |
| 1 (comparative) | 2686.50 | 274.90 |
| | 2188.00 | 278.00 |
| | 2176.00 | 278.18 |
| | 2167.50 | 277.50 |
| | 1794.22 | 284.10 |
| | 1624.70 | 284.4 |
| 2 (inventive) | 2867.96 | 279.52 |
| | 2833.50 | 278.67 |
| | 2382.00 | 281.35 |
| | 2263.90 | 281.00 |
| | 2034.45 | 285.50 |
| | 2023.64 | 284.30 |
| | 1790.98 | 288.19 |
| | 1778.80 | 287.70 |

Thus, the experimental results demonstrate that the use of the invention leads to the highly improved separation of the monomer to polymer while feeding the degassing extruder. Using equal process conditions there is less energy necessary to degassing the monomer in the first degassing zone, shown as a higher temperature in the upstream of the polymer. This means that less monomer is transported upstream of the polymer and therefore less energy need to be introduced into the degassing extruder for degassing monomer in the following degassing sections.

The invention claimed is:

1. A device for degassing a polymer material, comprising:

at least one nozzle part having a convergent geometry, at least one constant part, and at least one diffusor part having a divergent geometry, wherein the at least one diffusor part comprises a first zone Z1, having a first length L1 and a first opening angle A1, a second zone Z2, having a second length L2 and a second opening angle A2, and a third zone Z3, having a third length L3 and a third opening angle A3, wherein each of the first zone Z1, the second zone Z2, and the third zone Z3 exhibit a divergent geometry, and wherein the following applies:

$$A1 < A2 < A3,$$

wherein for a ratio of length and opening angle in the at least one diffusor part, the following applies $$L1/A1 > L2/A2 > L3/A3.$$

2. The device according to claim 1, wherein the ratio L2/A2 of the second zone Z2 of the at least one diffusor part is from 33% to 43% of the ratio L1/A1 of the first zone Z1 of the at least one diffusor part, and the ratio L3/A3 of the third zone Z3 of the at least one diffusor part is from 5% to 15% of the ratio L1/A1 of the first zone Z1 of the at least one diffusor part.

3. The device according to claim 1, wherein in the first zone Z1, the ratio of length and opening angle L1/A1 is in a range of 0.2 to 0.5 mm/°, in the second zone Z2, the ratio of length and opening angle L2/A2 is in a range of 0.1 to 0.3 mm/°, and in the third zone Z3, the ratio of length and opening angle L3/A3 is in a range of 0.02 to 0.1 mm/°.

4. The device according to claim 1, wherein the at least one diffusor part has a total length L4, wherein the first length L1 is from 41% to 51% of the total length L4;

the second length L2 is from 32% to 42% of the total length L4; and the third length L3 is from 12% to 22% of the total length L4.

5. The device according to claim 1, wherein the at least one diffusor part consists of the first zone Z1, the second zone Z2, and the third zone Z3, which are arranged in a downstream direction in the order Z1-Z2-Z3.

6. The device according to claim 5, wherein the at least one constant part has a length L5, wherein said length L5 is from 5% to 25% of the total length L4 of the at least one diffusor part.

7. The device according to claim 5, wherein the at least one nozzle part has a length L6, wherein said length L6 is from 20% to 40% of the total length L4 of the at least one diffusor part.

8. The device according to claim 7, wherein the device further comprises:

a constant part, arranged upstream of the at least one nozzle part, having a length L9, wherein the length L9 of said constant part is from 1.0 to 3.0 times of the length L6 of the at least one nozzle part.

9. The device according to claim 1, wherein a ratio of a greatest diameter of the at least one nozzle part in relation to a smallest diameter of the at least one nozzle part is in a range of 2 to 4.

10. A degassing extruder for degassing a polymer material, comprising:

at least one material feed, at least one extrudate outlet, and at least one degassing section, which encompasses at least one degassing zone provided in a region of the at least one material feed, and at least one gas outlet, wherein at least one of the device for degassing according to claim 1 is provided to feed the polymer material from the at least one material feed into the at least one degassing zone.

11. A process for degassing a polymer material, comprising at least one polymer and at least one monomer, with the degassing extruder according to claim 10, the process comprising:

feeding the polymer material into the at least one degassing zone within the degassing extruder, through the at least one of the device for degassing, wherein the polymer material is at least partially degassed and wherein a gas stream arises in the at least one degassing zone.

12. The process for degassing according to claim 11, wherein an extent of degassing of the polymer material by feeding the polymer material through the at least one of the device for degassing is greater >5% by weight, based on a total amount of monomers in the polymer material.

13. The process for degassing according to claim 12, wherein a degassed polymer stream arising in the at least one degassing zone during degassing is conveyed in a downstream direction, and the gas stream arising in the at least one degassing zone during degassing is conveyed in opposition to the degassed polymer stream.

14. A process for degassing a polymer material, the process comprising:

feeding the polymer material through at least one device according to claim 1, into at least one degassing zone, wherein the polymer material is at least partially degassed and wherein a gas stream arises in the at least one degassing zone.

15. The device according to claim 7, wherein the length L5 is from 10% to 20% of the total length L4.

* * * * *